(12) United States Patent
Lee et al.

(10) Patent No.: US 8,225,163 B2
(45) Date of Patent: Jul. 17, 2012

(54) METHOD FOR RESOURCE ALLOCATION IN HARQ

(75) Inventors: Jung Hoon Lee, Seoul (KR); Eun Sun Kim, Seoul (KR); Bong Hoe Kim, Gyeonggi-do (KR); Young Woo Yun, Seoul (KR); Dong Youn Seo, Seoul (KR); Ki Jun Kim, Seoul (KR); Suk Hyon Yoon, Seoul (KR); Joon Kui Ahn, Seoul (KR); Hak Seong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 842 days.

(21) Appl. No.: 12/297,613

(22) PCT Filed: Apr. 19, 2007

(86) PCT No.: PCT/KR2007/001900
§ 371 (c)(1),
(2), (4) Date: Jan. 28, 2009

(87) PCT Pub. No.: WO2007/120017
PCT Pub. Date: Oct. 25, 2007

(65) Prior Publication Data
US 2009/0240999 A1     Sep. 24, 2009

(30) Foreign Application Priority Data

Apr. 19, 2006 (KR) .................. 10-2006-0035260

(51) Int. Cl.
*G06F 11/00* (2006.01)
(52) U.S. Cl. ........................................................ 714/748
(58) Field of Classification Search .................... None
See application file for complete search history.

(56) References Cited

U.S. PATENT DOCUMENTS

| | | | | |
|---|---|---|---|---|
| 5,636,230 A | * | 6/1997 | Marturano et al. | 714/748 |
| 7,853,852 B2 | * | 12/2010 | Ihm et al. | 714/748 |
| 2003/0072285 A1 | * | 4/2003 | Onggosanusi et al. | 370/335 |

FOREIGN PATENT DOCUMENTS

| | | |
|---|---|---|
| EP | 1389848 | 2/2004 |
| JP | 3765792 | 4/2006 |
| KR | 1020030075183 | 9/2003 |
| KR | 10-2005-0033996 | 4/2005 |
| WO | 2007027052 | 3/2007 |

* cited by examiner

*Primary Examiner* — Michael Maskulinski
(74) *Attorney, Agent, or Firm* — Lee, Hong, Degerman, Kang & Waimey

(57) ABSTRACT

A resource allocation method for use in a system for performing a decoding function by combining an first-transmitted packet with a re-transmitted packet includes: transmitting a packet using N resource blocks (where N=integer>0); receiving a first negative-acknowledgement (NACK) signal for the packet; and re-transmitting the packet using M resource blocks according to the first NACK signal (where M=N>integer>0). Therefore, the resources can be efficiently allocated during the re-transmission.

7 Claims, 3 Drawing Sheets

[Figure 1]
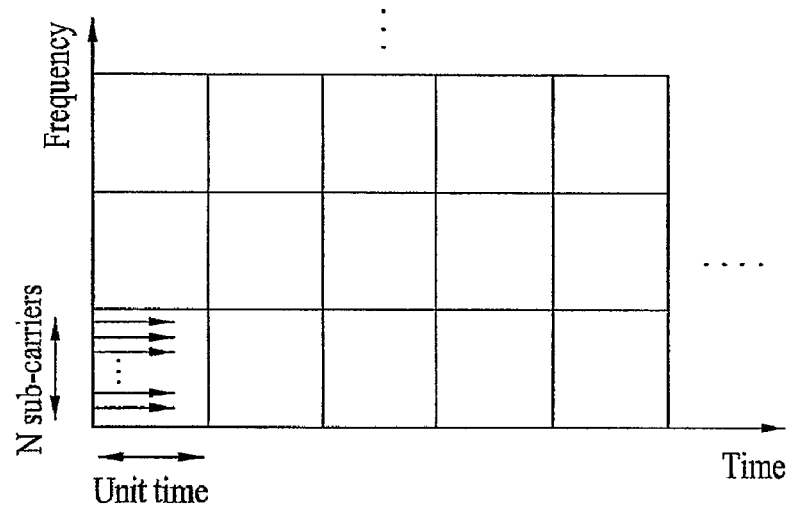

[Figure 2]
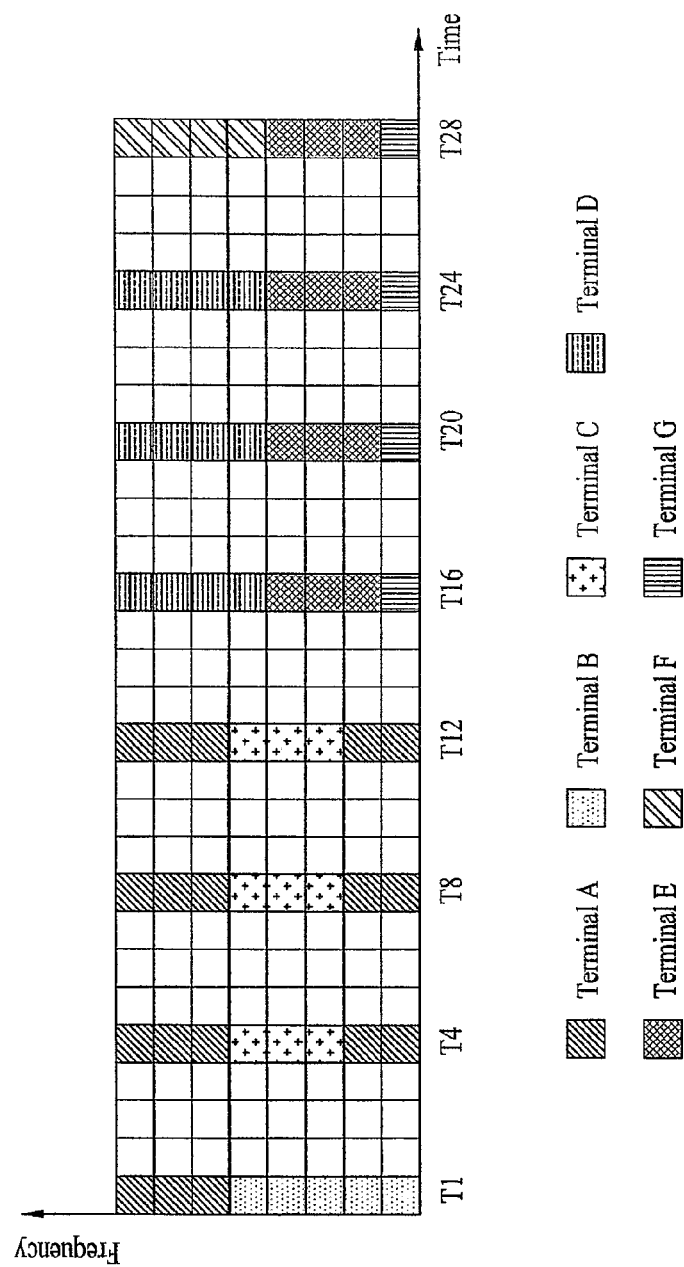

[Figure 3]
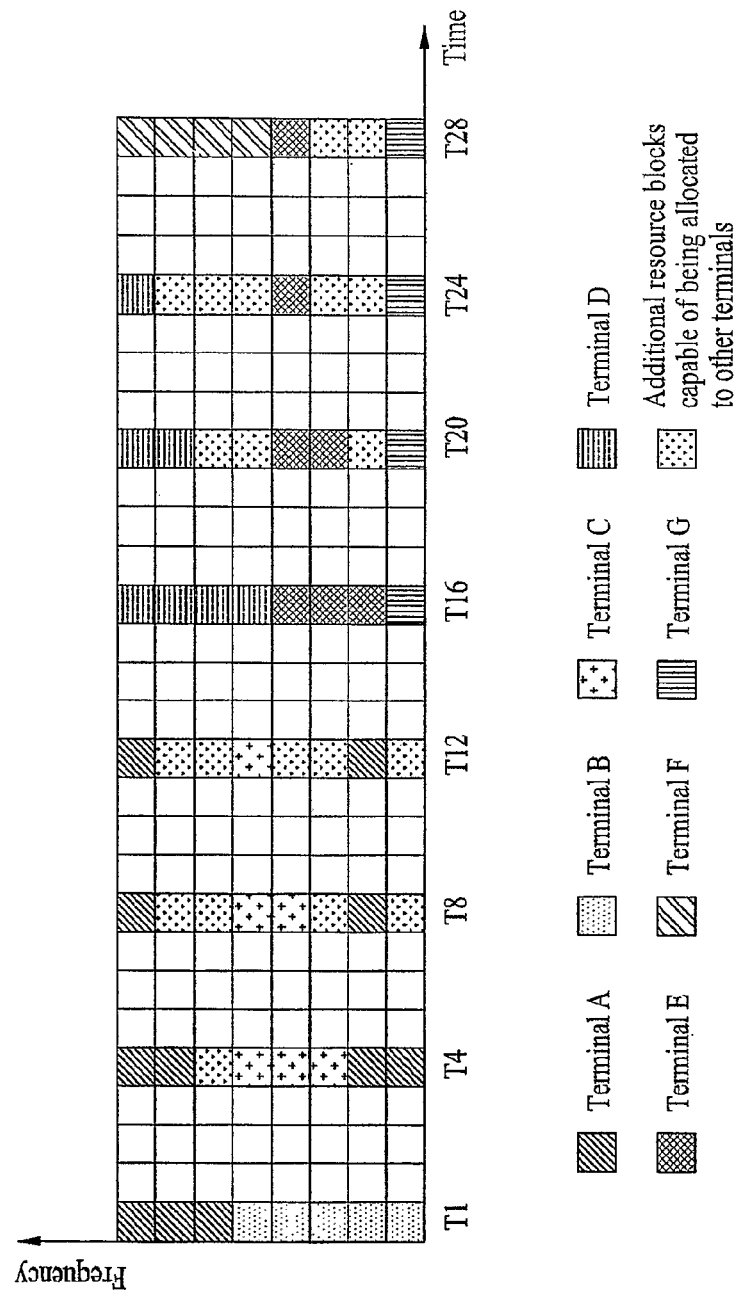

METHOD FOR RESOURCE ALLOCATION IN HARQ

CROSS-REFERENCE TO RELATED APPLICATIONS

This application is the National Stage filing under 35 U.S.C. 371 of International Application No. PCT/KR2007/001900, filed on Apr. 19, 2007, which claims the benefit of earlier filing date and right of priority to Korean Application No. 10-2006-0035260, filed on Apr. 19, 2006.

TECHNICAL FIELD

A resource allocation method for use in a communication system, and more particularly a resource allocation method for performing a decoding process by combining an first-transmitted packet with a re-transmitted packet are presented.

BACKGROUND ART

In a mobile communication system, a single base station (i.e., Node-B) communicates with at least one mobile station over a radio frequency (RF) channel. In a system for transmitting a packet over a multiple sub-carrier, a base station receives the packet over a wired Internet, and transmits the received packet to each mobile station according to a predetermined communication scheme. In this case, downlink scheduling takes a role in determining when the base station transmits data, what frequency bandwidth the base station uses and which mobile station the base station transmits data to. The base station receives data from the mobile station using a pre-determined communication scheme, demodulates the received data, and transmits the demodulated packet to the wired Internet.

Uplink scheduling takes a role in determining when the mobile station transmits data, what frequency bandwidth the mobile station uses and which base station the mobile station transmits data to. Typically, a mobile station having a good channel condition can transmit/receive data using much more frequency resources during a longer time.

In communication system for performing communication using at least two carriers, communication resource includes a time-domain resource and a frequency-domain resource, and the time-domain resource and the frequency-domain resource can be defined in predetermined units. For example, a resource block composed of N sub-carriers and M time units (e.g., M sub-frames) can be defined (where, N or M may be set to an integer>1)

FIG. 1 shows an example of the resource block.

Referring to FIG. 1, each square indicates a single resource block. The single resource block comprises the set of a pre-determined number of sub-carriers transmitted within a pre-determined time.

In a downlink, the base station allocates the resource block to a selected mobile station according to a predetermined scheduling rule, and transmits data to the mobile station using the allocated resource block.

In an uplink, the base station allocates the resource block to the selected mobile station according to a predetermined scheduling rule, and transmits data to the base station using the resource block.

A method for controlling a packet-reception failure is classified into an automatic repeat request (ARQ) and a hybrid automatic repeat request (HARQ).

In the ARQ, if a transmitter receives an acknowledgement (ACK) signal after transmitting a packet (or a frame), it transmits a new packet. Otherwise, if the transmitter receives a negative acknowledgement (NACK) signal, it re-transmits the packet.

If a receiver receives a packet and successfully decodes the received packet, it transmits an ACK signal. Otherwise, if the receiver fails to decode the packet, it transmits a NACK signal, deletes the received packet from a buffer, and waits for a re-transmission packet.

In the HARQ, if a transmitter receives an acknowledgement (ACK) signal after transmitting a packet, it transmits a new packet. Otherwise, if the transmitter receives a negative acknowledgement (NACK) signal, it re-transmits the packet to which a FEC (Forward Error Correction) coding is applied.

Therefore, if the decoding process for the received packet is successfully performed, the receiver transmits the ACK signal. Otherwise, it transmits the NACK signal and stores the received packet in a buffer. Upon receipt of the re-transmission packet according to the NACK signal, the receiver combines the re-transmission packet with the stored packet, and decodes the combined result, to increase a successful reception rate.

The HARQ can be classified into a synchronous HARQ and an asynchronous HARQ according to re-transmission timing.

In case of the synchronous HARQ, if a first transmission of a packet fails, a re-transmission of the packet is executed at a specific time determined by the system. For example, if the system is designed to re-transmit the packet at intervals of a fourth time unit after the first transmission failure, there is no need to inform the receiver of any information about re-transmission time. Therefore, if the transmitter receives the NACK signal, it re-transmits the packet at intervals of four time units.

In case of the asynchronous HARQ, re-transmission time information is scheduled. Therefore, the re-transmission time corresponding to the NACK signal is changed according to a variety of factors such as a channel condition.

The HARQ can be classified into a channel-adaptive HARQ and a channel-non-adaptive HARQ on the basis of specific data indicating whether channel condition information is reflected or not in determining an amount of resources for re-transmission.

The channel-non-adaptive HARQ uses a same number of resource blocks determined in a first transmission to modulate a re-transmission packet. For example, if the transmitter transmits data using 8 resource blocks for a first transmission, it re-transmits the data using the 8 resource blocks in the same manner of the first transmission.

The channel-adaptive HARQ changes the number of resource blocks to modulate a re-transmission packet according to channel conditions. For example, although the transmitter transmits data using 8 resource blocks for a first transmission, it re-transmits the data using 8 or less resource blocks according to channel condition.

A synchronous HARQ, an asynchronous HARQ, a channel-non-adaptive HARQ, and a channel-adaptive HARQ method are combined to acquire four type HARQ control methods. Representative examples of the four type HARQ control methods are an as synchronous channel-adaptive HARQ and a synchronous channel-non-adaptive HARQ.

The asynchronous channel-adaptive HARQ adaptively changes a re-transmission timing and an amount of resources according to channel condition, such that it can more efficiently re-transmit desired data. However, the asynchronous channel-adaptive HARQ has a disadvantage in that it inevitably increases overhead.

The synchronous channel-non-adaptive HARQ fixes a re-transmission timing and an amount of resources required for the re-transmission, such that almost no overhead is required for the re-transmission. However, the synchronous channel-non-adaptive HARQ has a disadvantage in that it inevitably deteriorates re-transmission efficiency.

A system for transmitting a signal using at least two carriers allocates radio resources in units of a resource block composed of the set of a predetermined number of sub-carriers transmitted within a fixed time. In case that the radio resources are allocated in resource block units, method of allocating radio resources efficiently to a mobile station that performs re-transmission is needed.

DISCLOSURE OF INVENTION

Technical Problem

Accordingly, a resource allocation method for use in a communication system that substantially obviates one or more problems due to limitations and disadvantages of the related art is presented.

More specifically, a resource allocation method for use in a communication system capable of performing a decoding process by combining an first-transmitted packet with a re-transmitted packet, such that it can efficiently allocate resources during the re-transmission is presented.

Technical Solution

To acquire advantages and in accordance with the purpose of this application, as embodied and broadly described herein, a resource allocation method applied in a system for decoding by combining an first-transmitted packet with a re-transmitted packet comprising; transmitting a packet using N resource blocks; receiving a first negative-acknowledgement (NACK) signal for the packet; and re-transmitting the packet using M resource blocks according to the first NACK signal, wherein N, M are integers bigger than 0 and M is smaller than N.

The resource allocation method further comprising: receiving a second negative-acknowledgement (NACK) signal for the packet transmitted via the M resource blocks; and re-transmitting the packet using L resource blocks according to the second NACK signal, wherein L is integer bigger than 0 and L is smaller than M.

In the resource allocation method, it can be prescribed as $$p = \frac{M}{N} = \frac{L}{M}$$

where the value of p can be provided as predetermined or signaling-processed.

In the resource allocation method, a time interval from a time at which the packet is transmitted using N resource blocks to a time at which the packet is re-transmitted according to the first NACK signal is equal to a time interval from a time at which the packet is re-transmitted according to the first NACK signal to a time at which the packet is re-transmitted according to the second NACK signal.

In the resource allocation method, the M resource blocks select their locations from among locations of the N resource blocks on a frequency axis.

It is to be understood that both the foregoing general description and the following detailed description of the present invention are exemplary and explanatory and are intended to provide further explanation of the invention as claimed.

Advantageous Effects

The resource allocation method presented by the present application can perform a decoding process by combining an first-transmitted packet with a re-transmitted packet, such that it can efficiently allocate resources during the re-transmission.

BRIEF DESCRIPTION OF THE DRAWINGS

The accompanying drawings included to provide a further understanding of the present application, illustrate embodiments of the present application.

In the drawings:

FIG. 1 is a conceptual diagram illustrating a resource block;

FIG. 2 is a conceptual diagram illustrating a method for allocating radio resources in a synchronous non-adaptive HARQ according to a first preferred embodiment of the present application; and FIG. 3 is a conceptual diagram illustrating a method for allocating radio resources in a synchronous non-adaptive HARQ according to a second preferred embodiment of the present application.

BEST MODE FOR CARRYING OUT THE INVENTION

Reference will now be made in detail to the preferred embodiments of the present application, examples of which are illustrated in the accompanying drawings. Wherever possible, the same reference indexes will be used throughout the drawings to refer to the same or like parts.

FIG. 2 is a conceptual diagram illustrating a method for allocating radio resources in a synchronous non-adaptive HARQ according to a first preferred embodiment of the present invention.

Referring to FIG. 2, the synchronous non-adaptive HARQ system maintains the number of resource blocks allocated to a first transmission case during the re-transmission of data without any change, and can re-transmit the data at intervals of a predetermined period of time.

As can be seen from FIG. 2, data is re-transmitted at intervals of four time units, and the maximum number of times for re-transmission is set to 4.

Terminal A is allocated three resource blocks at the time of T1, and begins a first transmission. If a current time reaches the time of T4, the terminal A re-transmits data using the initially-allocated resource blocks at the same frequency location as that of the first transmission. In this case, the maximum number of times for re-transmission may be set to 4. Therefore, after the lapse of the time of T12, the Terminal A does not perform the re-transmission irrespective of the result of the latest re-transmission.

The D terminal begins the first transmission at the time of T16. However it performs the re-transmission only two times because the D terminal receives an ACK signal after second re-transmission.

The C terminal is allocated three resource blocks during the first transmission, such that it performs the re-transmission action using three resource blocks until receiving an ACK signal. Although there is no signaling associated with the re-transmission timing, the C terminal performs the re-transmission at intervals of a predetermined period of time.

FIG. 3 is a conceptual diagram illustrating a method for allocating radio resources in a synchronous non-adaptive HARQ according to a second preferred embodiment of the present application.

Referring to FIG. 3, the synchronous non-adaptive HARQ system allocates a pre-determined number of resource blocks during the first transmission, and can reduce the number of resource blocks allocated at a predetermined rate whenever the re-transmission is repeated. In other words, the synchronous non-adaptive HARQ system allocates a large amount of resources during the first transmission to transmit data at a high data rate (i.e., a high transfer rate), and reduces the number of allocated resource blocks during the re-transmission, thereby more efficiently employing the radio resources.

For example, the C terminal receives/uses three resource blocks at the time of T1 indicating a first transmission time. In the case of second transmission, the C terminal performs a re-transmission using two resource blocks. In the case of third transmission, the C terminal performs the re-transmission using only one resource block.

For example, the D terminal performs a first transmission using four resource blocks at the time of T16. Thereafter, the D terminal performs a re-transmission using two resource blocks, and performs the re-transmission using only one resource block. Therefore, if the number of resource blocks required for the re-transmission is reduced, the reduced resource blocks can be allocated to other mobile stations, such that radio resources can be used efficiently.

The above-mentioned method relates to a method for reducing the number of allocated resource blocks whenever the re-transmission is repeated. For another example, the number of allocated resource blocks can be reduced only once during a first re-transmission, and is maintained during the succeeding re-transmission.

The following equation 1 shows a method for calculating the number of resource blocks allocated to the k-th re-transmission (where k<K) on the condition that the maximum number of time for re-transmission is set to K.

$$R(k)=[R(k-1) \times p]$$ Equation 1

In Equation 1, R(k−1) is indicative of the number of resource blocks used for the (k-1)-th re-transmission, p(p≦1) is indicative of the rate for reducing the number of resource blocks during the succeeding re-transmission, and R(k) is indicative of the number of resource blocks allocated during the k-th re-transmission. For example, provided that the number of resource blocks allocated during the re-transmission is reduced by 50%, the value of p is equal to 0.5. If the number of resource blocks allocated during the first transmission is set to 4, the number of resource blocks required for the second re-transmission is set to 2, and the number of resource blocks required for the third re-transmission is set to 1. During the next re-transmission, the re-transmission is executed via only one resource block.

In the case of re-transmission of FIG. 2, the system can pre-determine whether to constantly maintain the number of allocated resource blocks. In the case of re-transmission of FIG. 3, the system can pre-determine whether to reduce the number of allocated resource blocks. If the system reduces the number of resource blocks to be allocated during the re-transmission, it can also pre-determine some rules of the reduction. In this way, if specific information (e.g., the increase or reduction of resource blocks, or reduction rules) between a mobile station and a base station is prescribed, the HARQ system can be activated without using the additional signaling process.

Selectively, the system can provide a signal for indicating whether to constantly maintain the number of allocated resource blocks during the re-transmission and/or whether to reduce the number of allocated resource blocks during the re-transmission. If the number of resource blocks during the re-transmission is reduced, the system can provide a signal for indicating which one of rules will be applied to reduce the number of the resource blocks.

Selectively, the system can pre-determine whether to constantly maintain the number of resource blocks during the re-transmission. And in case that the number of resource blocks is reduced during the re-transmission, the system can provide a signal for indicating the rules of the reduction.

In the case of a downlink, the base station may inform the mobile station of specific information indicating whether the re-transmitted frame is transmitted using resource blocks smaller than first-transmitted resource blocks or not.

In the case of an uplink, if the base station provides the mobile station of specific information indicating whether a re-transmission packet will be transmitted either using resource blocks smaller than first-transmitted resource blocks or using the same resource blocks as the first-transmitted resource blocks, the mobile station can re-transmit the packet according to the resource-block number notified by the base station.

If the number of allocated resource blocks during the re-transmission is reduced, it requires specific information about a pattern of the reduction. By the information, the system can recognize which one of patterns is applied to the reducing resource blocks within the initially-scheduled band.

In the meantime, if radio resources are allocated according to a frequency hopping scheme, the system requires specific information indicating that resource blocks are reduced according to a specific scheme corresponding to the frequency hopping pattern.

For example, as shown in FIG. 3, in case of the first transmission, three resource blocks are allocated, and the resource blocks corresponding to the lowest frequency can be firstly excluded from the re-transmission's allocation.

And in another case of the first transmission, the resource blocks corresponding to the highest frequency can be firstly excluded from the re-transmission's allocation. Therefore, the system requires specific information indicating the resource-block reduction pattern. This specific information associated with the resource-block reduction pattern may be pre-established between the mobile station and the base station, or the system may provides the specific information by an upper layer signaling.

In the resource-block reduction patterns, redundant resource blocks generated by exclusion of the re-transmission's allocation may be allocated to other mobile stations, such that the redundant resource blocks can be arranged on the basis of a frequency axis in the successive form as possible.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, a resource allocation method for use in a communication system according to the present invention can perform a decoding process by combining an first-transmitted packet with a re-transmitted packet, such that it can efficiently allocate resources during the re-transmission.

The invention claimed is:

1. A resource allocation method applied in a system for decoding by combining a first-transmitted packet with a re-transmitted packet, the method comprising:

transmitting a packet using N resource blocks;

receiving a first negative-acknowledgment (NACK) signal for packet;

re-transmitting the packet using M resources blocks according to the first NACK signal;

receiving a second NACK signal for the packet transmitted via the M resource blocks; and re-transmitting the packet using L resource blocks according to the second NACK signal, wherein N and M are integers greater than 0 and M is less than N, and wherein L is an integer greater than 0 and L is less than M.

2. The resource allocation method according to claim 1, wherein $$p = \frac{M}{N} = \frac{L}{M}$$

and the value of p is predetermined.

3. The resource allocation method according to claim 1, wherein $$p = \frac{M}{N} = \frac{L}{M}$$

and the value of p is signaling-processed.

4. The resource allocation method according to claim 1, wherein:

a time interval from a time at which the packet is transmitted using the N resource blocks to a time at which the packet is re-transmitted according to the first NACK signal is equal to a time interval from a time at which the packet is re-transmitted according to the first NACK signal to a time at which the packet is re-transmitted according to the second NACK signal.

5. The resource allocation method according to claim 1, wherein the M resource blocks select their locations from among locations of the N resource blocks on a frequency axis.

6. The resource allocation method according to claim 5, wherein the packet transmitted via the M resource blocks is indicative of a first-transmitted packet.

7. The resource allocation method according to claim 1, wherein the N resource blocks and the M resource blocks are allocated according to a predetermined hopping pattern.

* * * * *